US012597953B2

(12) United States Patent
Kim et al.

(10) Patent No.: US 12,597,953 B2
(45) Date of Patent: Apr. 7, 2026

(54) METHOD FOR CONTROLLING GAIN OF LOW NOISE AMPLIFIER AND BROADCAST RECEPTION APPARATUS FOR PERFORMING SAME

(71) Applicant: TELECHIPS INC., Seoul (KR)

(72) Inventors: Moonsoo Kim, Seoul (KR); Ijou Shin, Seoul (KR); Sungju Kim, Seoul (KR)

(73) Assignee: TELECHIPS INC., Seoul (KR)

( * ) Notice: Subject to any disclaimer, the term of this patent is extended or adjusted under 35 U.S.C. 154(b) by 354 days.

(21) Appl. No.: 18/255,115

(22) PCT Filed: Nov. 24, 2021

(86) PCT No.: PCT/KR2021/017370
§ 371 (c)(1),
(2) Date: May 31, 2023

(87) PCT Pub. No.: WO2022/119223
PCT Pub. Date: Jun. 9, 2022

(65) Prior Publication Data
US 2024/0030949 A1 Jan. 25, 2024

(30) Foreign Application Priority Data

Dec. 2, 2020 (KR) ........................ 10-2020-0166997
Apr. 13, 2021 (KR) ........................ 10-2021-0048015

(51) Int. Cl.
*H04B 1/10* (2006.01)
*H04B 17/10* (2015.01)
(52) U.S. Cl.
CPC ............. *H04B 1/10* (2013.01); *H04B 17/101* (2015.01)

(58) Field of Classification Search
CPC .................................. H04B 1/10; H04B 17/10
See application file for complete search history.

(56) References Cited

U.S. PATENT DOCUMENTS

2018/0234066 A1 8/2018 Kang et al.

FOREIGN PATENT DOCUMENTS

| | | | |
|---|---|---|---|
| JP | 2006109200 A | | 4/2006 |
| KR | 10-0818002 B | | 3/2008 |
| KR | 10-2009-0060841 A | | 6/2009 |
| KR | 10-2010-0127450 A | | 12/2010 |
| KR | 10-2011-0005409 A | | 1/2011 |
| KR | 20110005409 | * | 1/2011 |
| KR | 10-1036472 B | | 5/2011 |
| KR | 10-1790960 B | | 11/2017 |

OTHER PUBLICATIONS

Korean PCT Search Report & Written Opinion for PCT/KR2021/017370 mailed Feb. 17, 2022.

* cited by examiner

*Primary Examiner* — Myron Wyche

(57) ABSTRACT

A low noise amplifier (LNA) gain control method and a broadcast receiving device performing the same are disclosed. The method includes determining a LNA gain control based on a power measurement value of a received broadcast signal, confirming whether the received broadcast signal corresponds to a service channel period, stopping the LNA gain control when the received broadcast signal corresponds to the service channel period, and performing the LNA gain control when the received broadcast signal does not correspond to the service channel period.

4 Claims, 5 Drawing Sheets

100

104 102 103

POWER DETECTION VALUE

RF TUNER

POWER DETECTION VALUE

BASEBAND DEMODULATOR

101 POWER DETECTOR

FIRST ADC

108

110

105

LNA FILTER PGA

SECOND ADC

109

DEMODULATOR 106 107

BASEBAND AGC CONTROL SIGNAL

111

ADC RMS 112 113

RF AGC CONTROL SIGNAL

BASEBAND AGC UNIT

RF AGC UNIT

TIMING SELECTOR

100

METHOD FOR CONTROLLING GAIN OF LOW NOISE AMPLIFIER AND BROADCAST RECEPTION APPARATUS FOR PERFORMING SAME

TECHNICAL FIELD

The present disclosure relates to a low noise amplifier (LNA) gain control method and a broadcast receiving device performing the same.

BACKGROUND ART

Saturation of analog devices may be avoided by performing automatic gain control (AGC) appropriately using a power detector (PD) output value in an RF tuner. Basically, when the PD value increases, saturation may be avoided, and the overall gain may be maintained uniform by detecting an increase in the PD value, and lowering the gain of an RF LNA.

However, when controlling the gain of the LNA, an RF AGC has a gain of about 15 dB. Accordingly, the gain of about 15 dB generated when controlling the gain of the LNA causes a gain discontinuity in which the signal strength is greatly changed instantaneously. Noise due to the gain discontinuity has a problem of causing a reception screen or sound disconnection at the same time as a service selected in a current broadcast signal.

DISCLOSURE

Technical Problem

The present disclosure attempts to provide a gain control time adjusting method and a broadcast receiving device performing the same capable of preventing noise generated when controlling the gain of a low noise amplifier (LNA) from influencing a broadcast signal being received.

Technical Solution

An embodiment of the present disclosure provides a method of controlling a low noise amplifier (LNA) gain by a broadcast receiving device including determining a LNA gain control based on a power measurement value of a received broadcast signal, confirming whether the received broadcast signal corresponds to a service channel period, stopping the LNA gain control when the received broadcast signal corresponds to the service channel period, and performing the LNA gain control when the received broadcast signal does not correspond to the service channel period.

The confirming may include determining a service channel period in a main service channel (MSC) by parsing a fast information channel (FIC) of the received broadcast signal.

The determining may include comparing an average value of power measurement values of broadcast signals measured during a certain period with a preset reference value, determining a decrease in a LNA gain mode level when the average value is greater than the reference value, and determining an increase in the LNA gain mode level when the average value is less than the reference value, and the increase or the decrease in the LNA gain mode level may be performed when a reception period of the broadcast signal is not the service channel period.

Another embodiment of the present disclosure provides a broadcast receiving device including a low noise amplifier (LNA) configured to adjust an output level of a broadcast signal received through an antenna to a specified gain, an automatic gain control unit configured to generate an automatic gain control signal for controlling a gain level of the LNA and output the automatic gain control signal to the LNA, and a timing selector configured to provide information for determining a gain control time of the LNA to the automatic gain control unit, and the automatic gain control unit obtains information about whether the broadcast signal is received in a service channel period from the timing selector, and outputs the automatic gain control signal to the LNA when a reception period of the broadcast signal is not the service channel period.

The timing selector may confirm a service channel period in an MSC from an FIC obtained by modulating the broadcast signal, determine whether the broadcast signal is received in the service channel period based on confirmation, and provide a result of determination to the automatic gain control unit.

The broadcast receiving device may further include a power measurement unit configured to measure power of a broadcast signal output by the LNA and output a measured power value, and the automatic gain control unit may compare the power value with a preset reference value, when the power value is greater than the reference value, determine a decrease in an LNA gain mode level, when the power value is less than the reference value, determine an increase in the LNA gain mode level, and generate an automatic gain control signal according to the determination.

The broadcast receiving device may further include an analog-to-digital converter configured to convert an analog power value output by the power measurement unit into a digital power value, and the automatic gain control unit may use the digital power value.

The LNA gain mode level may include a high gain mode, a mid gain mode, and a low gain mode in descending order of gains.

Advantageous Effects

According to an embodiment, it is possible to prevent a screen or sound disconnection phenomenon of a broadcast signal being received, by avoiding noise generated during RF AGC control from influencing the broadcast signal currently being received.

MODE FOR INVENTION

Figure 1:
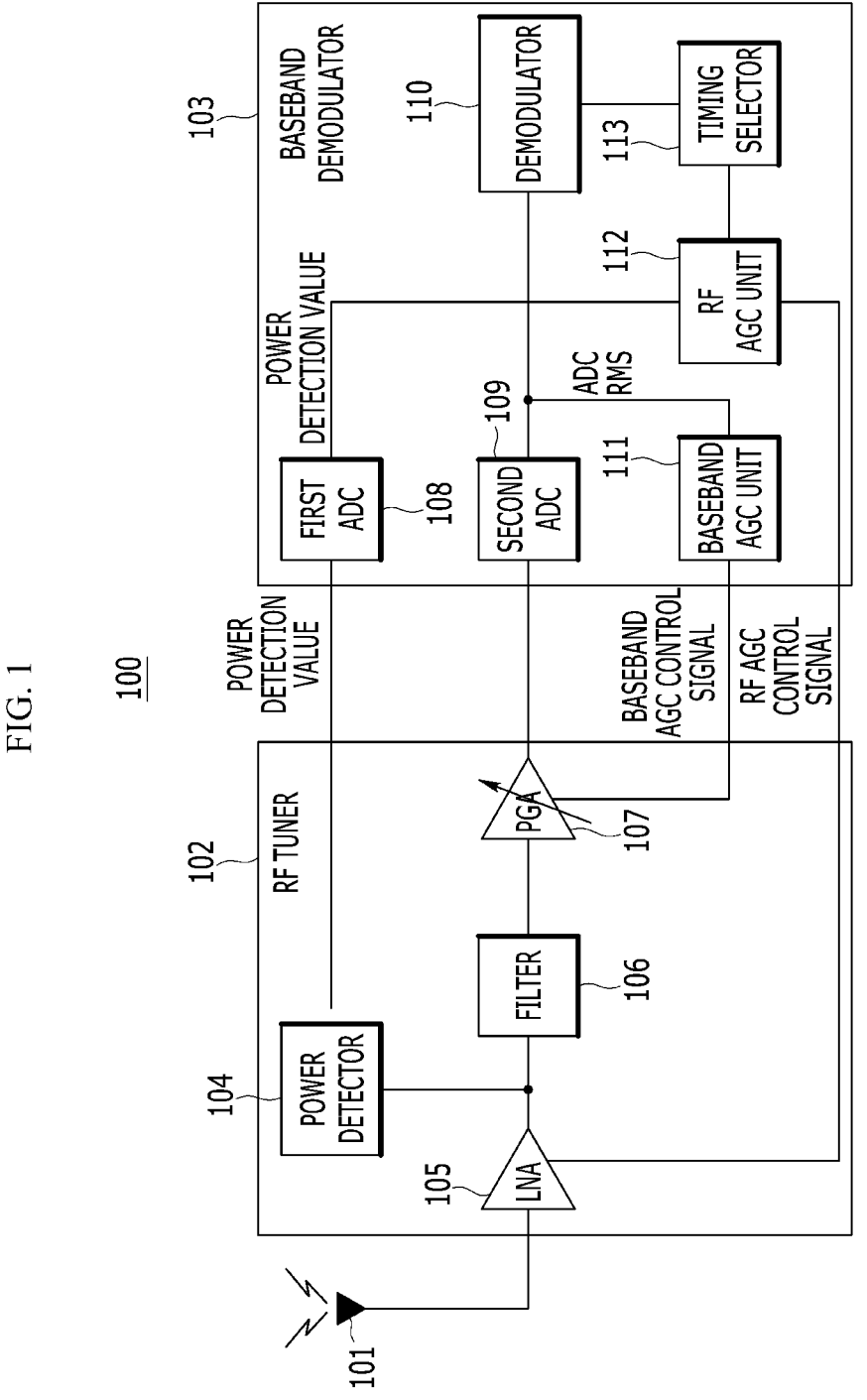
FIG. 1 is a block diagram illustrating a configuration of a broadcast receiving device according to an embodiment.

Hereinafter, with reference to the accompanying drawings, embodiments of the present disclosure will be described in detail so that those skilled in the art may easily carry out the present disclosure. However, the present disclosure may be embodied in many different forms and is not limited to the embodiments described herein. Also, in order to clearly explain the present disclosure, parts irrelevant to the description are omitted in the drawings, and similar reference numerals are denoted to similar parts throughout the specification.

Throughout the specification, unless explicitly described to the contrary, the word "comprise", and variations such as "comprises" or "comprising", will be understood to imply the inclusion of stated elements but not the exclusion of any other elements.

In addition, the terms "-er", "-or", and "module" described in the specification mean units for processing at least one function and operation, and may be implemented by hardware components or software components, and combinations thereof.

Devices described in the present disclosure are configured as hardware including at least one processor, a memory device, a communication device, etc., and a program combined with the hardware and executed is stored in a designated location. The hardware has the configuration and performance capable of performing the method of the present disclosure. The program includes instructions implementing the operating method of the present disclosure described with reference to the drawings and is combined with hardware such as a processor and a memory device to execute the present disclosure.

In the specification, "transmission or provision" may include not only direct transmission or provision, but also indirect transmission or provision through another device or by using a detour path.

In the specification, expressions written in the singular may be interpreted in the singular or plural unless an explicit expression such as "one" or "single" is used.

In the specification, like reference numerals refer to like elements regardless of drawings, and "and/or" includes each of the stated elements and all combinations of one or more of the stated elements.

The terms including an ordinal number, such as first, second, etc., may be used to describe various components, but the components are not limited by the terms. These terms are used only for the purpose of distinguishing one component from another. For example, a first element may be named as a second element, and similarly, the second element may also be named as the first element, without departing from the scope of the present disclosure.

In the flowchart described with reference to the drawings, the order of operations may be changed, several operations may be merged, an operation may be divided, and certain operations may not be performed.

Figure 2:
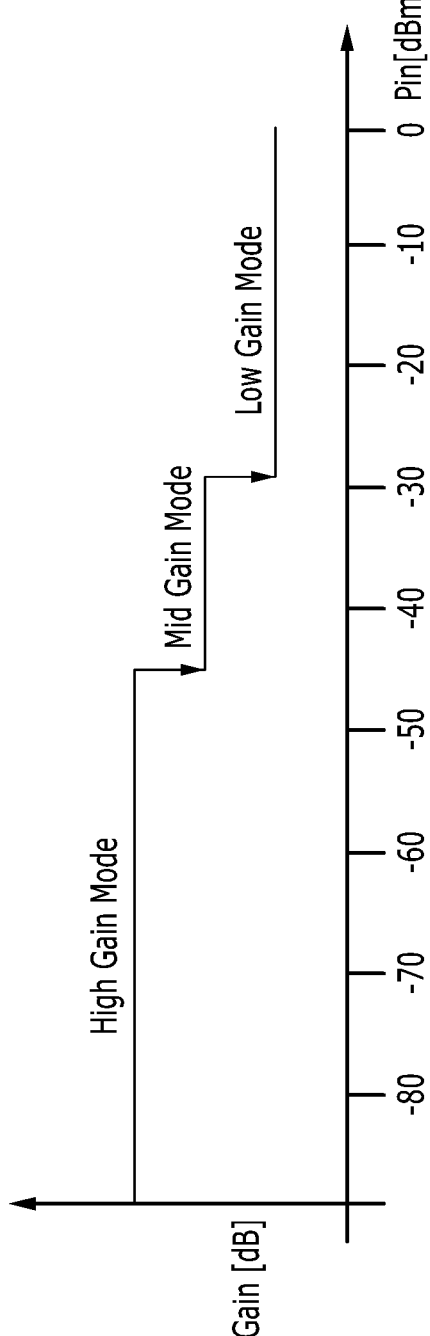
FIG. 2 is a diagram illustrating a low noise amplifier (LNA) gain control mode according to an embodiment.

FIG. 1 is a block diagram illustrating a configuration of a broadcast receiving device according to an embodiment. FIG. 2 is a diagram illustrating a low noise amplifier (hereinafter collectively referred to as 'LNA') gain control mode according to an embodiment.

Referring to FIG. 1, a broadcast receiving device 100 may receive a broadcast signal such as digital audio broadcasting (DAB) in an audio video navigation (AVN) system in a vehicle.

The broadcast receiving device 100 largely includes an antenna 101, a radio frequency (RF) tuner 102, and a baseband demodulator 103.

The RF tuner 102 includes a power detector (PD) 104, an LNA 105, a filter 106, and a programmable gain amplifier (hereinafter collectively referred to as 'PGA') 107.

The baseband demodulator 103 includes a first analog-to-digital converter (ADC) 108, a second ADC 109, a demodulator 110, and a baseband automatic gain control (collectively referred to as 'AGC') unit 111, an RF AGC unit 112, and a timing selector 113.

The PD 104 detects the power of a broadcast signal output by the LNA 105. The power detector 104 outputs a measured power value of the broadcast signal output by the LNA 105 to the first ADC 108.

The LNA 105 adjusts an output level of a weak signal received from the antenna 101 to a gain level determined under the control of the RF AGC unit 112 while minimizing amplification of noise as much as possible. That is, the output of the broadcast signal received through the antenna 101 is adjusted while the broadcast signal passes through the LNA 105.

The filter 106 may filter a specific frequency band from the broadcast signal output by the LNA 105. According to an embodiment, the filter 106 may remove noise outside the specific frequency band by passing through a specific frequency band.

The PGA 107 amplifies the broadcast signal filtered through the filter 106 to a preset amplification gain, that is, an amplification gain determined under the control of the baseband AGC unit 111.

The first ADC 108 converts an analog type power detection value output by the PD 104 into a digital type power detection value. The power detection value converted by the first ADC 108 is output to the RF AGC unit 112.

The second ADC 109 converts an amplified analog broadcast signal output by the PGA 107 into a digital broadcast signal. The digital broadcast signal is output to the demodulator 110 and the baseband AGC unit 111.

The demodulator 110 demodulates the digital broadcast signal output by the second ADC 109 to generate a baseband signal.

The baseband AGC unit 111 controls the PGA 107 by using an ADC RMS value to match a signal strength transmitted to the demodulator 110. The baseband AGC unit 111 detects the strength of the digital broadcast signal output by the second ADC 109 and generates a baseband AGC control signal that adjusts the gain of the PGA 107 according to the detected signal strength.

The baseband AGC unit 111 receives an ADC root-mean-square (RMS) from the second ADC 109 and adjusts the gain of the PGA 107 based on the ADC RMS. Here, the ADC RMS corresponds to a result value obtained by, by the second ADC 109, processing an output value of the second ADC 109 by a RMS. The second ADC 109 bundles 10 bits of an ADC output to configure a single sample unit, outputs a result value obtained by processing the single sample unit by the RMS to the baseband AGC unit 111, and uses the result value as a signal for controlling the baseband AGC unit 111.

A baseband AGC control signal is output to the PGA 107. The PGA 107 performs an amplification function with a gain determined according to the baseband AGC control signal.

The RF AGC unit 112 controls the LNA 105 by using the power detection value to prevent an input signal from being saturated. The RF AGC unit 112 controls the LNA 105 by using the power detection value to prevent a broadcast reception value set in the RF tuner 102 from exceeding.

The RF AGC unit 112 determines the gain of the LNA 105 based on the power detection value output by the first ADC 108 and generates an RF AGC control signal for adjusting the gain of the LNA 105 with the determined gain. The RF AGC control signal is output to the LNA 105. The LNA 105 adjusts an output level with a gain determined according to the RF AGC control signal.

Referring to FIG. 2, the RF AGC unit 112 may control the gain of the LNA 105 by using a gain mode of the total of three stages according to the strength of the received signal.

The gain mode of three stages has a gain of about 15 dB and is divided into a high gain mode, a mid gain mode, and a low gain mode according to the received signal.

The RF AGC unit 112 may adjust a gain mode level based on the power detection value. That is, the RF AGC unit 112 lowers the gain mode level of the LNA when the power detection value is greater than a preset reference value. For example, the RF AGC unit 112 may adjust the gain mode of the LNA from the high gain mode to the mid gain mode.

Also, the RF AGC unit 112 increases the gain mode level of the LNA when the power detection value is less than the preset reference value. For example, the RF AGC unit 112 may adjust the gain mode of the LNA from the mid gain mode to the high gain mode.

The RF AGC unit 112 may determine the gain mode by modeling a 'reference value-power detection value' as shown in Table 1 below.

TABLE 1

| Items | Index | Gain mode |
|---|---|---|
| reference value > power detection value | 1 | increase gain mode level |
| reference value < power detection value | −1 | decrease gain mode level |

Here, the RF AGC unit 112 may compare an average value of power detection values accumulated for a certain period of time with a reference value.

During the gain mode level control of the LNA 105, a gain of about 15 dB is generated. Accordingly, the gain of 15 dB instantaneously causes a gain discontinuity in which the signal strength is greatly changed. Noise due to the gain discontinuity does not always cause deterioration in reception performance, but may cause a reception screen or sound disconnection at the same time as a service selected in a current broadcast signal.

Accordingly, the timing selector 113 performs a function of selecting a gain control time so that noise that may be generated during RF AGC gain control does not influence the broadcast signal currently being received.

The timing selector 113 decodes a broadcast reception service frame in the demodulator 110 and identifies a broadcast service period based on a decoding result.

The timing selector 113 parses a fast information channel (hereinafter collectively referred to as 'FIC') to identify a currently selected service and finds a service region in a main service channel (hereinafter collectively referred to as 'MSC').

The timing selector 113 determines whether a channel through which the broadcast signal is currently received is the service period and outputs a result of determination to the RF AGC unit 112.

The RF AGC unit 112 determines not to perform LNA gain control in the service channel period. That is, the RF AGC unit 112 determines the gain control time of the LNA 105 so as to control the gain only in a period excluding the broadcast service period.

The RF AGC unit 112 determines whether a transmission frame currently being received from the timing selector 113 is a service channel. The RF AGC unit 112 determines LNA gain control when the transmission frame currently being received is not the service channel, that is, not a service broadcast signal, through a search result of the timing selector 113. On the other hand, when the service broadcast signal is currently being received, that is, when the transmission frame currently being received is the service channel, the RF AGC unit 112 stops LNA gain control.

An operation of the RF AGC unit 112 will be described as follows.

Figure 3:
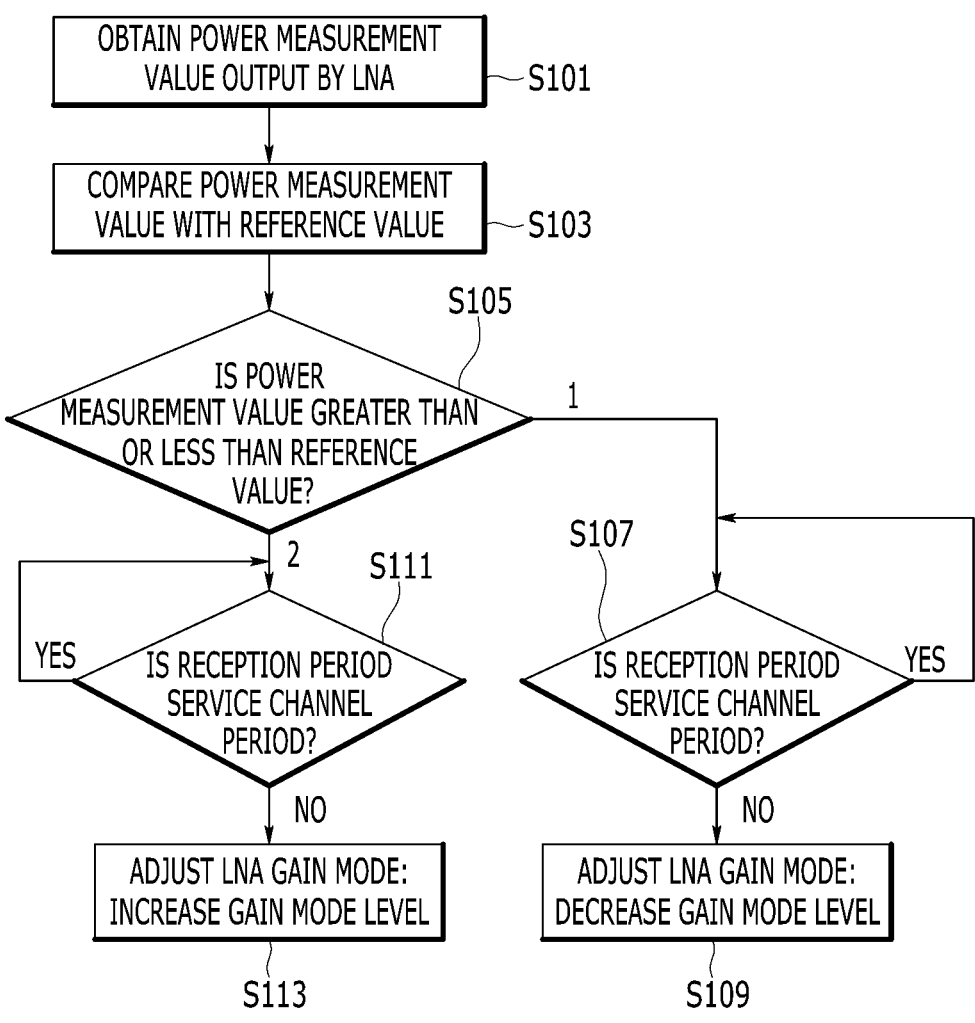
FIG. 3 illustrates a procedure of controlling an LNA gain according to an embodiment.

FIG. 3 illustrates a procedure of controlling an LNA gain according to an embodiment.

Referring to FIG. 3, the RF AGC unit 112 obtains a power measurement value output by the LNA 105 from the first ADC 108 (S101).

The RF AGC unit 112 compares the power measurement value obtained in S101 with a preset reference value (S103). In this regard, the power measurement value may compare an average value of power measurement values obtained during a certain time period, for example, periods T1 to Tn, with the reference value.

The RF AGC unit 112 determines whether the power measurement value is greater than or less than the reference value (S105).

When determining that the power measurement value is greater than the reference value in S105, the RF AGC unit 112 determines whether a reception period of a broadcast signal is a service channel period from the timing selector 113 (S107).

When it is determined in S107 that the reception period is the service channel period, the procedure returns to before S107.

When it is determined in S107 that the reception period is not the service channel period, the RF AGC unit 112 decreases a LNA gain mode level when adjusting an LNA gain mode (S109).

Meanwhile, when it is determined that the power measurement value is less than the reference value in S105, the RF AGC unit 112 determines whether the reception period of the broadcast signal is the service channel period from the timing selector 113 (S111).

When it is determined in S111 that the reception period is the service channel period, the procedure returns to before S111.

When it is determined in S111 that the reception period is not the service channel period, the RF AGC unit 112 increases the LNA gain mode level when adjusting the LNA gain mode (S113).

Figure 4:
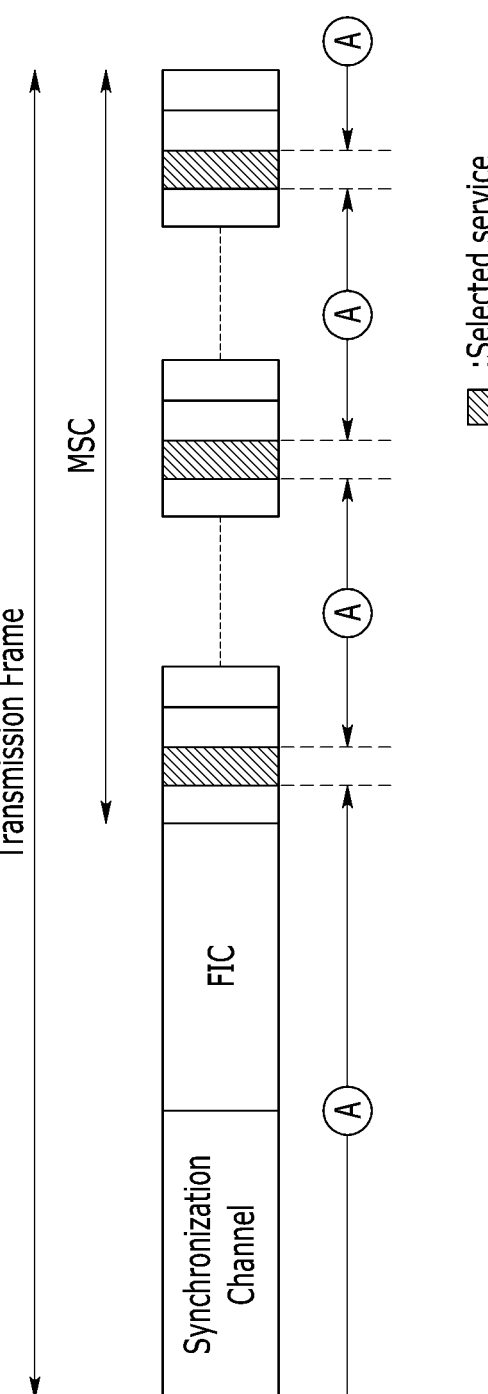
FIG. 4 is a diagram illustrating an LNA gain control time according to an embodiment.

FIG. 4 is a diagram illustrating a gain control time of an LNA according to an embodiment.

Referring to FIG. 4, a transmission frame of a digital audio broadcasting (DAB) signal includes a synchronization channel, a fast information channel (FIC), and a main service channel (MSC). The FIC includes service channel information of the MSC. Accordingly, the timing selector 113 may parse a transmission frame of the demodulator 110 and determine a service period in the MSC from the FIC. In the service period, LNA gain control is discontinued.

Figure 5:
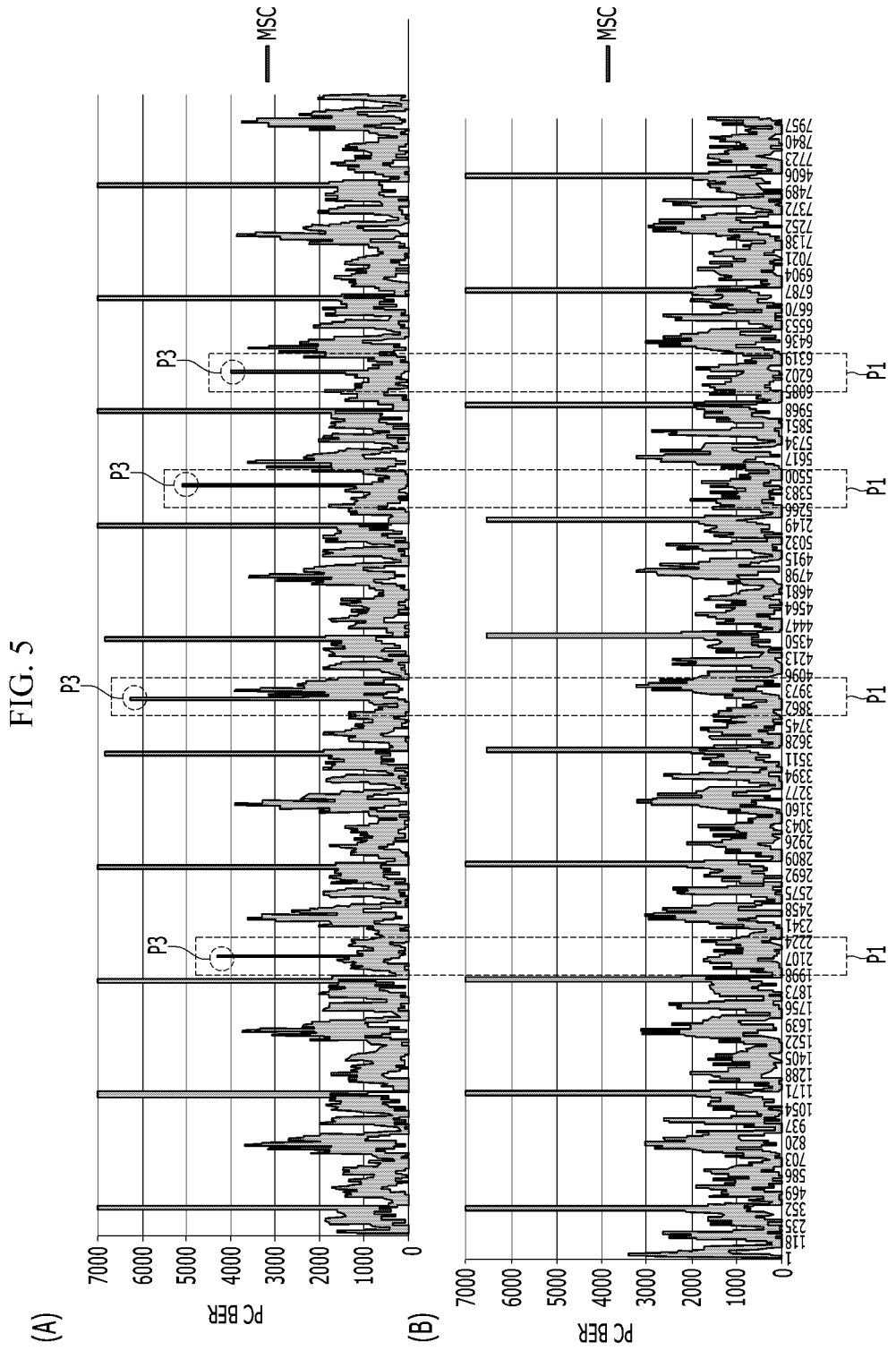
FIG. 5 illustrates a result of comparing a pseudo channel bit error rate (PCBER) waveform of a main service channel (MSC) signal before and after an embodiment is applied.

As such, when LNA gain control is performed only in a region other than a service point currently being received, the influence of noise generated during RF AGC control may be avoided as shown in FIG. 5.

FIG. 5 illustrates a result of comparing a pseudo channel bit error rate (PCBER) waveform of an MSC signal before and after an embodiment is applied.

Referring to (A) of FIG. 5, a graph shows the PCBER waveform of the MSC signal before the embodiment is applied, and it may be seen from the graph that noise P3 is generated in a period P1 in which LNA gain control is performed.

On the other hand, referring to (B) of FIG. 5, a graph shows the PCBER waveform of the MSC signal after the embodiment is applied. Because LNA gain control was performed except for a service period, the instantaneous rise of a BER due to noise caused by LNA gain control, that is, the noise P3, was removed. As such, according to an embodiment of the present disclosure, it is possible to prevent a screen and sound disconnection that may occur during broadcast reception.

The embodiments of the present disclosure described above are not implemented only through the device and method, and may be implemented through a program that realizes a function corresponding to the configuration of the embodiments of the present disclosure or a recording medium having recorded thereon the program.

Although the embodiments of the present disclosure have been described in detail above, the scope of the present disclosure is not limited thereto, and various modifications and improvements of those skilled in the art using the basic concept of the present disclosure defined in the following claims also fall within the scope of the present disclosure.

The invention claimed is:

1. A method of selecting a gain control time of a low noise amplifier (LNA) by a broadcast receiving device to prevent a screen and sound disconnection of a broadcast signal, the method comprising:

decoding a broadcast reception service frame in a demodulator and identifying a service channel period based on the decoding result;

parsing a fast information channel to identify a currently selected service and finding a service region in a main service channel;

determining whether a channel through which the broadcast signal is currently received is the service channel period;

determining a LNA gain control based on a power measurement value of a received broadcast signal;

stopping the LNA gain control when the received broadcast signal corresponds to the service channel period; and performing the LNA gain control only when the received broadcast signal does not correspond to the service channel period.

2. The method of claim 1, wherein:

the determining includes comparing an average value of power measurement values of broadcast signals measured during a certain period with a preset reference value;

determining a decrease in a LNA gain mode level when the average value is greater than the reference value; and determining an increase in the LNA gain mode level when the average value is less than the reference value, and wherein the increase or the decrease in the LNA gain mode level is performed when a reception period of the broadcast signal is not the service channel period.

3. A broadcast receiving device comprising:

a low noise amplifier (LNA) configured to adjust an output level of a broadcast signal received through an antenna to a specified gain;

a power measurement unit configured to measure power of the broadcast signal by the LNA and to output a measured power value;

an automatic gain control unit configured to generate an automatic gain control signal for controlling a gain level of the LNA and to determine a required adjustment of an LNA gain mode level based on the measured power value compared to a reference value and generate the automatic gain control signal for controlling the gain level of the LNA; and a timing selector configured to parse a fast information channel (FIC) to identify a service channel period in a main service channel (MSC) and provide information for determining a gain control time of the LNA to the automatic gain control unit, wherein the automatic gain control unit is configured to obtain information about whether the broadcast signal is received in the service channel period from the timing selector, and output the automatic gain control signal to the LNA only when a reception period of the broadcast signal is not the service channel period to prevent a screen and sound disconnection phenomenon of the broadcast signal being received.

4. The broadcast receiving device of claim 3, wherein the automatic gain control unit is configured to compare the measured power value with a preset reference value, when the measured power value is greater than the reference value, determine a decrease in the LNA gain mode level, when the measured power value is less than the reference value, determine an increase in the LNA gain mode level, and generate the automatic gain control signal according to the determination.

* * * * *